(12) United States Patent
Shinozaki

(10) Patent No.: US 6,801,342 B1
(45) Date of Patent: Oct. 5, 2004

(54) IMAGE SCANNER

(75) Inventor: Yuji Shinozaki, Tokyo (JP)

(73) Assignee: NEC Corporation, Tokyo (JP)

(*) Notice: Subject to any disclaimer, the term of this patent is extended or adjusted under 35 U.S.C. 154(b) by 993 days.

(21) Appl. No.: 09/139,711

(22) Filed: Aug. 25, 1998

(30) Foreign Application Priority Data

Aug. 25, 1997 (JP) .............................................. 9-228460

(51) Int. Cl.[7] .................................................. H04N 1/40
(52) U.S. Cl. ........................ 358/461; 474/505; 474/509; 382/312
(58) Field of Search ................................ 358/411, 393, 358/417, 409, 481, 475, 497, 474, 404, 494, 461, 509, 505; 348/344, 221, 298, 98, 220; 382/312, 317, 318, 319

(56) References Cited

U.S. PATENT DOCUMENTS 5,285,294 A * 2/1994 Takeuchi ..................... 358/474
6,011,880 A * 1/2000 Tani et al. ................... 382/312

FOREIGN PATENT DOCUMENTS

| JP | 49-66143 | 6/1974 |
| JP | 62-196972 | 8/1987 |
| JP | 3-220859 | 9/1991 |
| JP | 9-153988 | 6/1997 |
| JP | 9-233265 | 9/1997 |

* cited by examiner

Primary Examiner—King Y. Poon
(74) Attorney, Agent, or Firm—Foley & Lardner LLP

(57) ABSTRACT

An image scanner allows the reflection from the image on the face containing the image data to read of an original to strike on a one-dimensional image sensor and thus scans and reads the entire image on the original's face. The image scanner includes brightness sensing means for sensing ambient brightness and means for varying the reading speed of the one-dimensional image sensor in accordance with the brightness sensed by the brightness sensing means. In light surroundings, the scanner generates relatively fast clock signals, making the original's face scanning faster according to these clock signals, producing image data signals without saturating their output capacity. In dark surroundings, the scanner generates relatively slow clock signals, making the original's face scanning slower according to these signals, producing image data signals with a satisfactory S/N ratio.

7 Claims, 3 Drawing Sheets

ID SCANNER

BACKGROUND OF THE INVENTION

1. Field of the Invention

The present invention relates to an image scanner, particularly a desk stand type image scanner that scans the face containing the image data to read of an original page placed with its face up.

2. Description of the Related Art

In conventional desk stand type image scanners, image reading means for reading the image data on an original placed on the original setting table consist of a one-dimensional image sensor, a beam condensing lens, and a reflecting mirror. In addition to the primary scan, a secondary scan of an original is performed by the rotation of the reflecting mirror, and thus two-dimensional images are obtained. Despite of whatever environments where such image scanners be installed, the antecedent machines have rotated the reflecting mirror to carry out the secondary scan at a constant speed to scan an original's face containing the image data to read at a uniform rate.

Consequently, these machines have sometimes failed to obtain high quality images if placed in dark surroundings less than an allowable range of brightness, since there was not the light quantity enough to assure the operation of the one-dimensional sensor used in them, resulting in a poor signal-to-noise (S/N) ratio. In light surroundings more than an allowable range of brightness, conversely, the light quantity is too much for the one-dimensional image sensor operating speed. This also has led to such trouble that the output of the one-dimensional sensor is saturated, causing image quality degradation. Thus, the operation of conventional desk stand type image scanners have only been assured in a limited range of brightness in the-environments where they are installed.

In a prior art reference, Japanese Published Unexamined Patent Application No. Hei 9-233265, such a desk stand type image reader has been disclosed that features: an image input unit includes an imaging lens and a one-dimensional image sensor; a hood is provided which just covers the maximum area in which the image input unit can read; the hood shuts out disturbance light from the surroundings of the location where the image input unit is installed; and lighting means are provided inside the hood. This image reader is, however, inevitably large in size, because it has the above-mentioned hood and the lighting equipment inside the hood.

SUMMARY OF THE INVENTION

An object of the present invention is to provide an image scanner of concise structure, enabling the expansion of the range of brightness within which the scanner can operate, while maintaining the image quality obtained by the image reader.

An image scanner according to the invention, equipped with a one-dimensional image sensor and an optical mechanism to scan an original placed with its face up in a limited area and makes the sensor read the image data on that face, comprises brightness sensing means for sensing the ambient brightness and means for varying the reading speed of the one-dimensional image sensor in accordance with the brightness sensed by the brightness sensing means.

The means for varying the reading speed of the one-dimensional image sensor comprise clock generating means including an A/D converter for converting an analog value of brightness that is output from the brightness sensing means into a digital value, a latch for latching each converted digital value of brightness, a ROM for performing the table conversion of each latched brightness value, an oscillator which outputs a basic clock signal, and a counter which divides the frequency of each basic clock signal by a fraction based on the table-converted value of brightness at any given timing; as well as a driver motor with its rotation speed varying, according to a clock signal that is output from the clock generating means.

The optical mechanism to make the one-dimensional image sensor read the image data on an original page may be implemented in either of the following manners: scanning the original's face containing the image data to read by focusing to a fixed sensor with a rotary mirror and fixed lens; and scanning the original's face by the movement of the lens and the image sensor. In either case, the light reflected from the original's face is allowed to strike on the one-dimensional image sensor.

The ambient brightness sensing means will output average illumination continuously or intermittently, depending on the illumination in the room where the scanner is placed.

Furthermore, the above brightness sensing means are realized by a brightness sensor which may be oriented either opposite to or directly toward the face of an original that contains the image data to read.

DETAILED DESCRIPTION OF PREFERRED EMBODIMENTS

Figure 1:
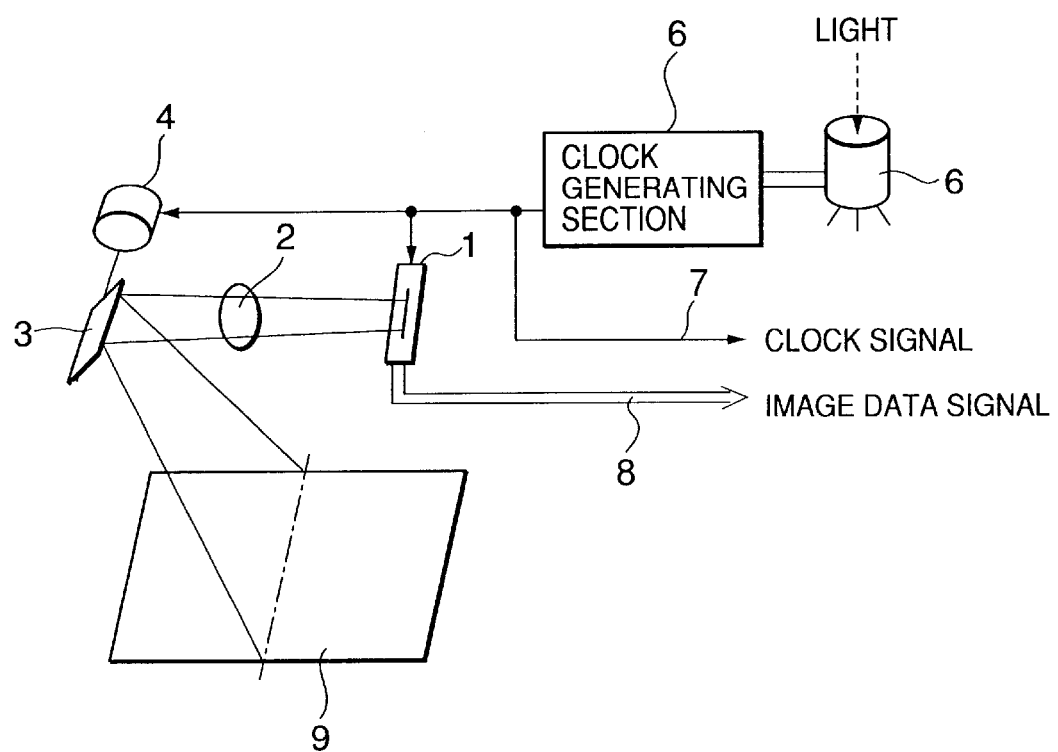
FIG. 1 is a schematic illustration showing the general structure of an image scanner according to the first preferred embodiment of the invention.

A preferred embodiment (the first) of the invention will now be described with reference to the related drawings. As shown in FIG. 1, an image scanner according to the first embodiment of the invention consists of a one-dimensional image sensor 1, a lens 2, a rotary mirror 3, a mirror driving motor 4, a clock generating section 5, and a brightness sensor 6. The image scanner outputs clock signals 7 and image data signals 8 to the external. The face of an original that contains the image data to read (referred to as an original's face hereinafter) 9 is the face, the image on which is to be read by the image scanner according to the invention. The image scanner is positioned over the original's face 9, but looking down slantwise so as not to cast its shadow on the original's face 9 and at a height enough not to be obstruction when the operator puts an original on the table.

The one-dimensional sensor 1, when a clock signal 7 is input to it, stores the light energy reflected from the image in one scan line on the original's face 9 and carried to it by being reflected from the rotary mirror 3 and through the lens 2, as one clock pixel (picture element). The sensor 1 then generates an image data signal 8 that represents the voltage level corresponding to the stored light energy and outputs it. If, for example, the reading resolution is 200 dots per inch, the image in one scan line is a vertical segment being $\frac{1}{200}$ inches wide of the image on the original's face. Every one clock input, the light energy reflected from this segmental image is stored by the one-dimensional image sensor as one pixel.

The rotary mirror 3 rotates in steps of angles in proportion to the number of pulses of the clock signals 7; it is a rotary plane mirror that is mounted on the mirror driving motor 4 such as a stepping motor. Clock signals, which are typically several hundreds of hertz to several kilohertz, cause the reflection from the image on the original's face 9 scanned from its forward end to backward end at a rate of several tens to hundreds of millimeters per second to strike on the one-dimensional image sensor 1. The rotary mirror 3 returns to its home position an angle that keeps it looking toward the forward end of the original's face by return means not shown, after reflecting the image on the original's face from its forward end to backward end onto the one-dimensional image sensor.

The lens 2 allows the light beams reflected by the rotation of the rotary mirror 3 from the image on the original's face 9 from its forward end to the backward end to strike sequentially on the one-dimensional image sensor 1.

The clock generating section 5 is given the brightness information from the brightness sensor that is installed facing up so as to sense all ambient brightness and generates clock signals 7, depending on the brightness; that is, it generates a high frequency clock signal 7 under bright conditions and a lower frequency clock signal 7 as the ambience becomes dark. The frequencies of clock signals 7 to be generated are preset to change step by step in response to the brightness information input, so that the light energy more than a given level will be stored by the image sensor 1 and unsaturated image data signals 8 obtained when the reflection from the image on an original's face 9 is applied to the image sensor 1.

If the image scanner according to the invention operates in relatively bright surroundings, the clock generating section 5 generates clock signals 7 with relatively high frequencies and therefore the rotary mirror 3 rotates at a relatively high speed in synchronization with the generated clock,signals 7. Under bright conditions, the original's face is also relatively bright, but the image sensor 1 also operates in synchronization with the generated clock signals 7 while storing the light energy reflected from all scan lines of the image on the original. Therefore, the light energy stored during one clock is not too high and no saturation occurs with image data signals 8 output from the image sensor 1.

If the above image scanner operates in relatively dark surroundings, the clock generating section 5 generated clock signals 8 with relatively low frequencies and the rotary mirror 3 rotates at a relatively low angular velocity.

Under dark conditions, the original's face 9 is also relatively dark, but the image sensor 1 stores the light energy reflected from all scan lines of the image on the original in response to the generated clock signals 7 of relatively long periods. Thus, the sensor can store the light energy more than a given level so that image data signals 8 with a satisfactory S/N ratio can be output.

Clock signals 7 are also output as the signals to indicate each line reading timing of image data signals 8 output by the image scanner.

As implied above, the image scanner according to the embodiment changes the rotation speed of the rotary mirror 3 according to the ambient brightness. In this way, the scanner can output good image data signals 8 which have a satisfactory S/N ratio and without being affected by saturation. And the scanner can also output clock signals 7 which are image data signal read timing signals of image data signal, whether it is placed in relatively bright or dark surroundings.

Figure 2:
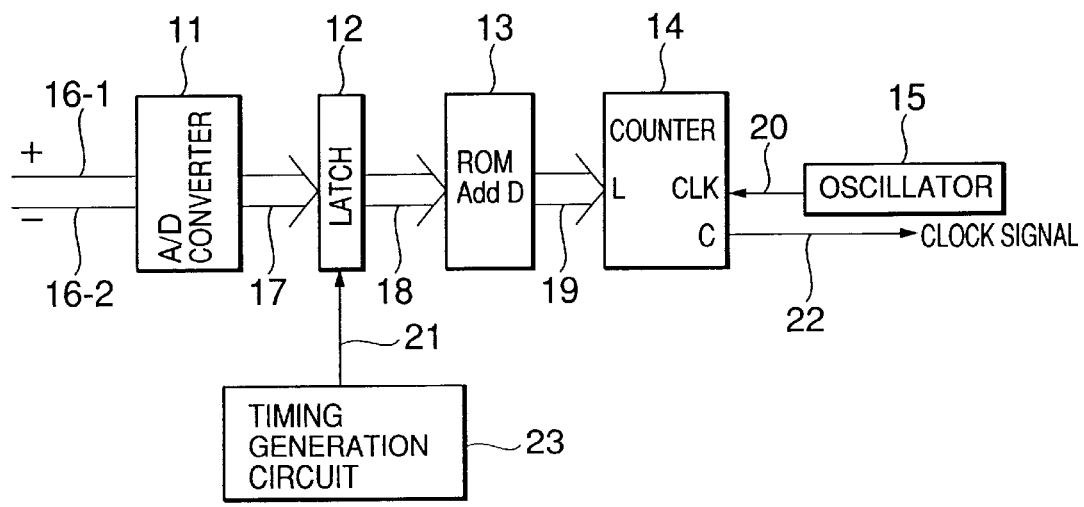
FIG. 2 is a block diagram showing the structure of the clock generating section of the image scanner according to the embodiment of the invention.

Then, the clock generating section 5 will be described by referring to FIG. 2. The clock generating section 5 consists of an A/D converter 11, a latch 12, a ROM 13, an n-ary counter 14, an oscillator 15, and a timing generation circuit 23. Signals from the brightness sensor 6 are input to pins 16-1 and 16-2 as potential difference.

Furthermore, the operation of the clock generating section 5 will be described below.

The A/D converter 11 first converts a signal input from the brightness sensor 6 into a digital signal 17. The latch 12 latches the digital signal 17 input to it after converted by the A/D converter 11 and outputs the data 18 latched in accordance with a timing signal 21 generated by the timing generation circuit 23.

The ROM 13 averages the data 18 input from the latch 12, using a predetermined number of data items held by it after input from the latch 12 in the past. Then, the ROM 13 generates data 19 that is used to generate a clock corresponding to the brightness by referencing a value thus averaged and the table retained in it.

The n-ary counter 14 generates a clock signal 22 to be input to the image sensor 1 and the mirror driving motor 4 by dividing the frequency of a basic clock 20 generated by the oscillator 15 by a fraction based on the data 19.

In this example, the ROM 13 can set freely the frequency of a clock signal output that is dependent on the number of data items used to average the data 18 and the averaged data 18 by rewriting the data previously written into the table in it.

The timing signal 21 gives the latch 12 a timing for the latch to receive a signal which has been A/D converted after output from the brightness sensor 6. The timing generation circuit 23 outputs one timing signal 21 for each one scan.

The timing generation circuit 23 delivers proper timing signals so that the rotation speed of the rotary mirror 3 will vary according to the ambient brightness and the image sensor 1 will produce good image data signals 8 with a satisfactory S/N ratio and without saturating their output capacity.

Then, the second embodiment of the invention will be described with reference to FIG. 3.

In the second embodiment, a rail 33 is erected on a table 31 and an optical mechanism 34 including a lens 36 and a one-dimensional image sensor 1 scans an original's face 32 placed on the table 31 as it moves along the rail 33. If, for example, the reading resolution is 200 dots per inch, the optical mechanism 34 moves at a rate of $\frac{1}{200}$ inches per clock. The rail 33 is arranged to overhang the original's face 32 at such angles that the optical mechanism 34 does not put its shadow on the original's face 32 and run parallel with long edges of a rectangular original's face at a height enough not to be obstruction when the operator puts an original on the table. A brightness sensor 35 is installed on the optical mechanism 34 so as to face up. With the above-mentioned method using a rotary mirror, angles of the light that comes from the original's face vary, which may cause slight image distortion. In the second embodiment, whereas, the light comes from the original's face 32 at a constant angle and there is less possibility of image distortion.

If the timing signals 21 for data reception by the latch 12 are delivered per row of scan and the number of data items used to average the received data is reduced, the reading speed of the one-dimensional sensor 1 can be varied continuously even during the scan of one original page. If ambient brightness changes at very short intervals, for example, under an overhead fluorescent lamp that lights, powered by AC, 50 to 60 Hz, the image on the original's face can be input to the scanner as if it would likely be placed under constant brightness conditions, provided that the number of data items for averaging the data input to the ROM is set corresponding to the scan segments in several milliseconds.

If one timing signal 21 for data reception by the latch 12 is delivered for each one complete scan of an original, the scanner can read the image data at a constant speed during the scan of one original page. Under the environments that the light quantity for a short period of time changes little, for example, under sunlight or incandescent lamps, the entire image on the original's face can be input to the scanner at a stable speed.

Figure 3:
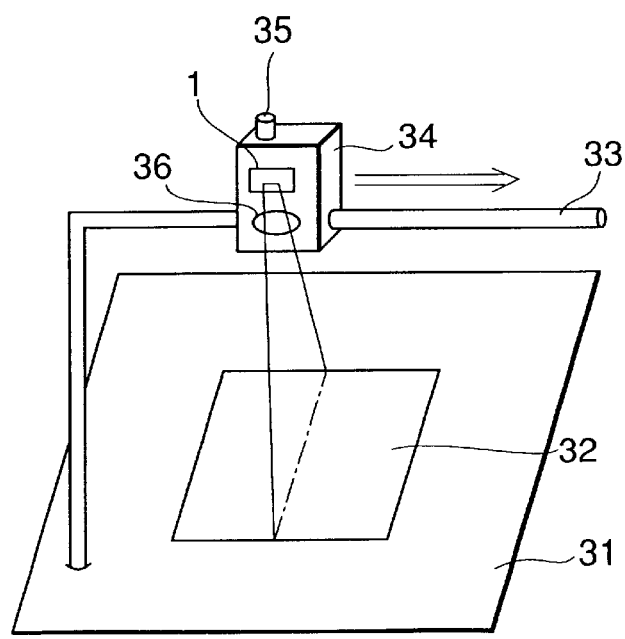
FIG. 3 is a schematic illustration showing the general structure of an image scanner according to the second preferred embodiment of the invention.

If the brightness sensor 6 according to the invention is set so as to face up as shown in FIG. 1 or FIG. 3, that is, its sensing direction is opposite to the original's face 32, the image on the original's face 32 can be read at a speed in accordance with the brightness of ambient light that irradiates the original's face from above without being affected by any patterns on the original.

Figure 4:
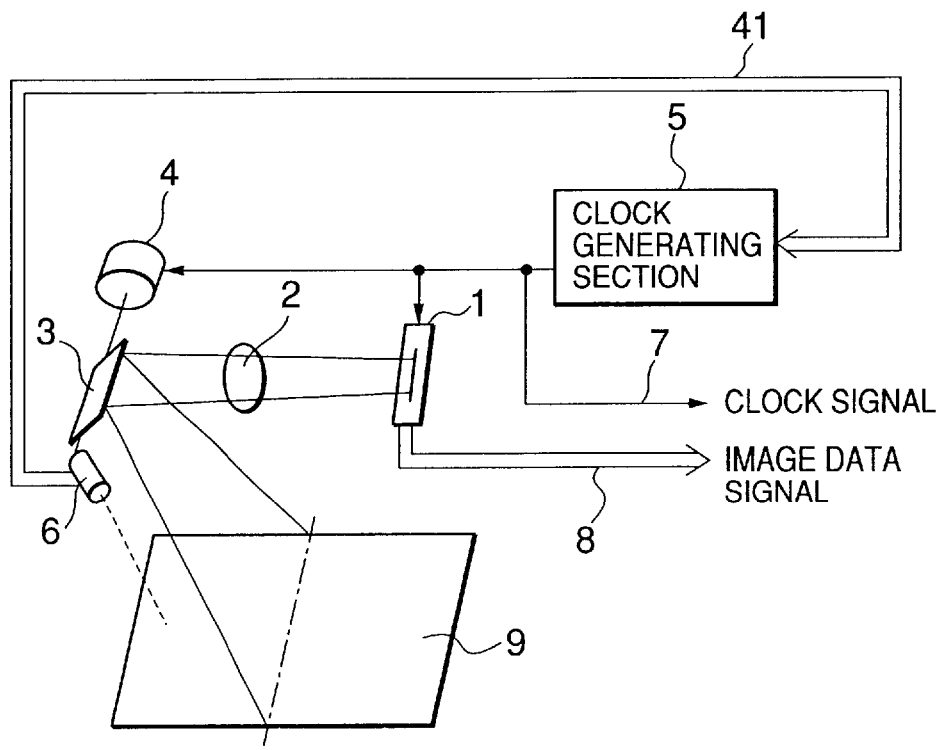
FIG. 4 is a schematic illustration showing the general structure of the image scanner according to the first embodiment of the invention, wherein a brightness sensor is installed so as to be oriented toward the face of an original.
Figure 5:
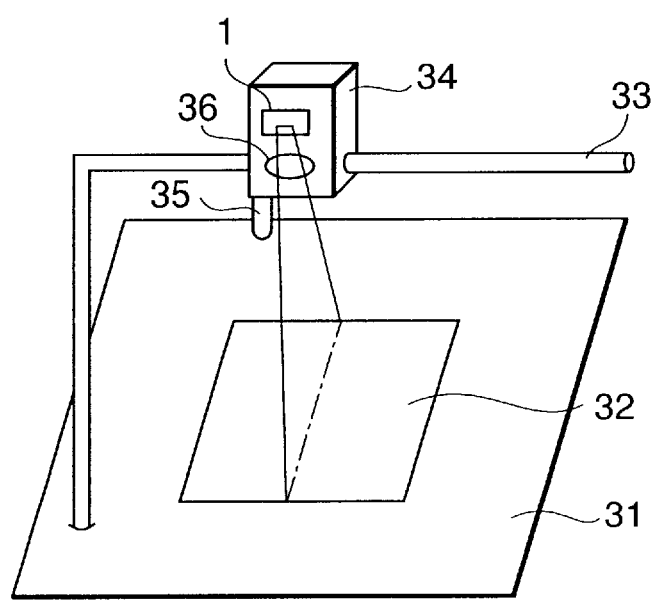
FIG. 5 is a schematic illustration showing the general structure of the image scanner according to the second embodiment of the invention, wherein a brightness sensor is installed so as to be oriented toward the face of an original.

Now, let us consider other examples of installing the brightness sensor as shown in FIG. 4 or FIG. 5; in the case (FIG. 5) where the optical mechanism 34 moves along the rail and the brightness sensor 35 is installed so as to face toward the original's face 32; and in the case (FIG. 4) where the brightness sensor 6 also faces toward the original's face 9. If, for example, the background color of the original's face 9 or 32 is colored other than white, the brightness sensor 6 or 35 allows the reading speed to be delayed according to the brightness of the background color, so that the scanner can read the image data as an image having sufficient brightness to scan.

Furthermore, in the case of FIG. 4 where a rotary mirror is used, the brightness sensor 6 installed on the rotary mirror 3 can be designed to have directivity. The sensing range of the brightness sensor 6 can thus be limited to such a segment of the original's face 9 that is being read and the reading speed will vary according to the brightness in the segment being read. In this case, even if the segments of an original have different brightness, the image on the original can be read as if the illumination on it would be uniform. In the case of FIG. 5, similarly, the sensing range of the brightness sensor 6 installed at the bottom of the optical mechanism 34 is such designed that the sensor senses the brightness only in a segment being read of the original's face 32. Thus, the reading speed will vary according to the brightness in the segment being read.

Prior art image scanners has been unable to obtain good image data outside a range of ambient brightness, typically 500 to 2000 lux. In ambient brightness conditions that it is as light as 4000 lux or as dark as 400 lux, however, the image scanner according to the invention is capable of obtaining good image data by making the image sensor read the image data on an original's face at variable speeds, depending on the ambient brightness, even using the same type of one-dimensional image sensor as used in antecedent machines. The use of the image scanner according to the invention can expand a range of ambient brightness for image scanners/readers to be able to obtain good image data.

What is claimed is:

1. An image scanner equipped with a one-dimensional image sensor and an optical mechanism to scan an original placed with its face up in a limited area and makes said image sensor read an image data on said original's face, comprising:

brightness sensing means for sensing the ambient brightness; and means for varying the reading speed of said one-dimensional image sensor in accordance with the brightness sensed by said brightness sensing means, wherein said varying means includes a clock frequency control means for controlling a clock frequency to be applied to said one-dimensional image sensor in accordance with the brightness sensed by said brightness sensing means.

2. The image scanner according to claim 1, wherein said clock frequency control means includes:

an A/D converter for converting the brightness sensed by said brightness sensing means into a data value;

a latch for latching each converted data;

a ROM having a table for converting each latched data value into a table-converted data value;

an oscillator for generating a basic clock signal; and a frequency divider for dividing a frequency of said basic clock signal by a fraction based on the table-converted data value.

3. The image scanner according to claim 1, wherein said optical mechanism makes the one-dimensional image sensor read the image data on said original's face by scanning the original's face by way of a lens and a rotary mirror, and rotation speed of said rotary mirror is controlled in accordance with the brightness sensed by said brightness sensing means.

4. The image scanner according to claim 1, wherein said brightness sensing means continuously outputs average illumination, depending on the illumination in a room where the scanner is placed.

5. The image scanner according to claim 1, wherein said brightness sensing means intermittently outputs average illumination, depending on the illumination in a room where the scanner is placed.

6. An image scanner comprising:

a one-dimensional image sensor;

an optical mechanism which scans an original placed with its face up in a limited area and makes said image sensor read an image data on said original's face;

a brightness sensor; and a clock generating circuit electrically coupled to said image sensor and to said brightness sensor, which varies a reading speed of said image sensor in accordance with a brightness sensed by said brightness sensor, by controlling a clock frequency applied to said image sensor in accordance with the brightness sensed by said brightness sensor.

7. A method of scanning an image with an image scanner, comprising:

placing an original containing image data with its face up toward a one-dimensional image sensor;

generating brightness information in a brightness sensor;

providing the brightness information from the brightness sensor to a clock generating circuit;

generating a clock signal having a frequency dependent on the brightness information;

providing the clock signal from the clock generating circuit to the image sensor; and operating the image sensor to read the image data, wherein a reading speed of the image sensor is synchronized with the clock signal.

* * * * *